United States Patent [19]

Adams

[11] 4,092,673
[45] May 30, 1978

[54] COMPATIBLE COMPOSITE IMAGE PROCESS

[76] Inventor: Jay W. Adams, 937 E. Groton Dr., Burbank, Calif. 91504

[21] Appl. No.: 687,442

[22] Filed: May 18, 1976

Related U.S. Application Data

[63] Continuation-in-part of Ser. No. 529,230, Dec. 3, 1974, abandoned.

[51] Int. Cl.² .................... H04N 5/22; H04N 5/24; G03B 15/08
[52] U.S. Cl. .................................. 358/183; 352/53; 358/185
[58] Field of Search ............... 358/183, 185; 352/48, 352/53, 88

[56] References Cited

U.S. PATENT DOCUMENTS

| | | | |
|---|---|---|---|
| 2,725,423 | 11/1955 | Graham | 358/185 |
| 2,968,211 | 1/1961 | Douglas | 352/53 |
| 3,778,542 | 12/1973 | Hanseman | 358/22 |
| 3,862,358 | 1/1975 | Wolff | 358/104 |
| 3,914,540 | 10/1975 | Slater | 358/183 |

*Primary Examiner*—Howard W. Britton
*Attorney, Agent, or Firm*—Wm. Jacquet Gribble

[57] ABSTRACT

The conventional chroma key television process is used to effect composite images by employing a master camera whose subject may be live action against a single hued background and a slave camera directed at a static background, such as a miniature set or a back-projection screen. The inventive process includes the steps of linking the master and slave cameras so that a sensing of the current flow in the actuating motors for panning, dollying, trucking or otherwise changing the master camera causes a scale-related like motion of the slave camera, each camera moving in proper ratio with respect to its subject. The slave camera image is fed to the conventional mixer and fills that portion of the composite image occupied by the single hued background of the master camera subject image. A time delay may slow transmission of the master camera to the mixer if it is found that the action or motion of the slave camera lags behind the like action or motion of the master camera.

4 Claims, 5 Drawing Figures

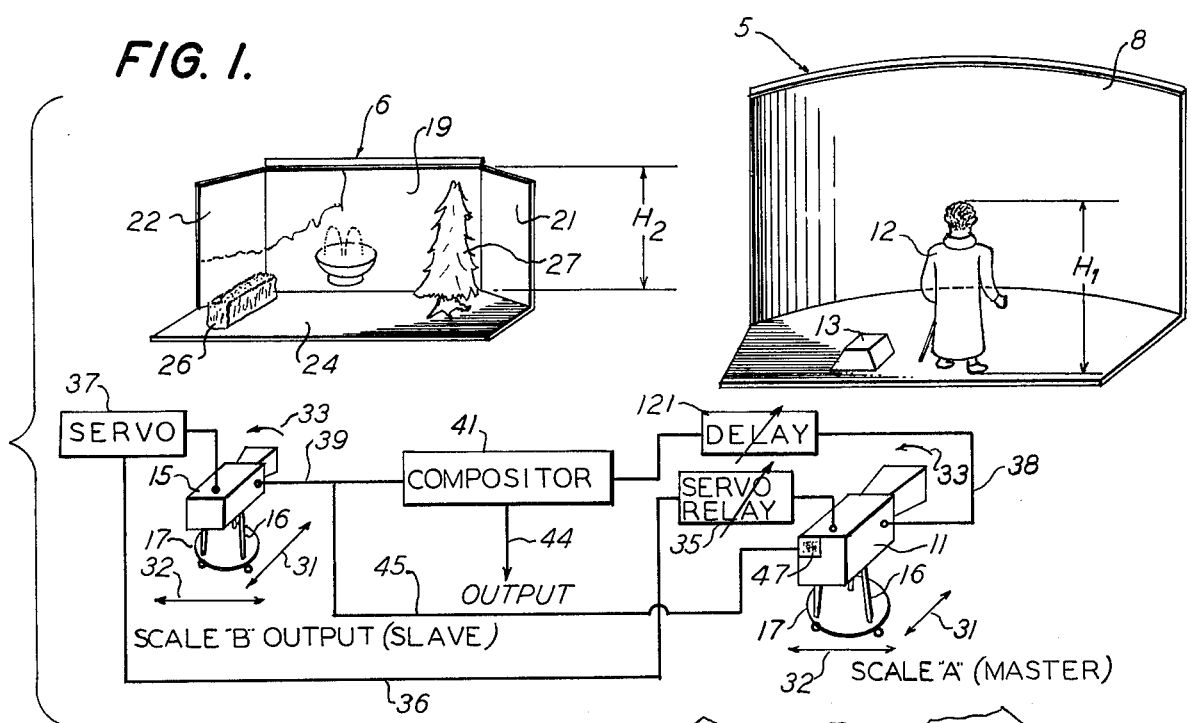
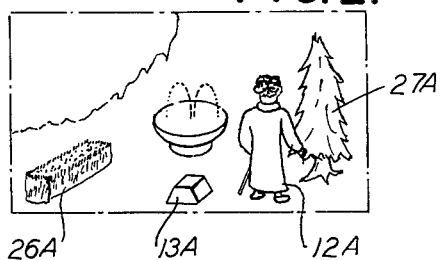
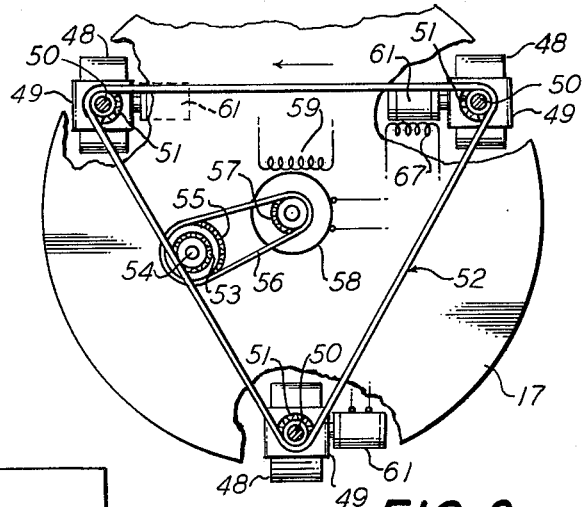
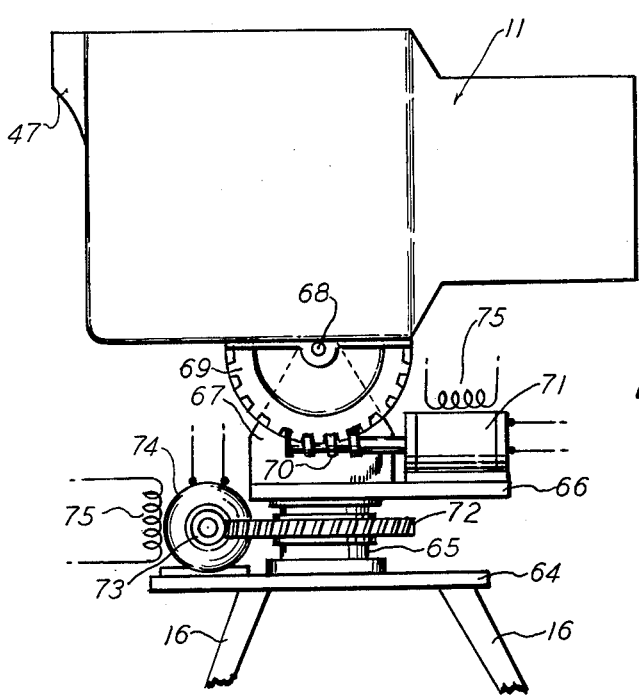

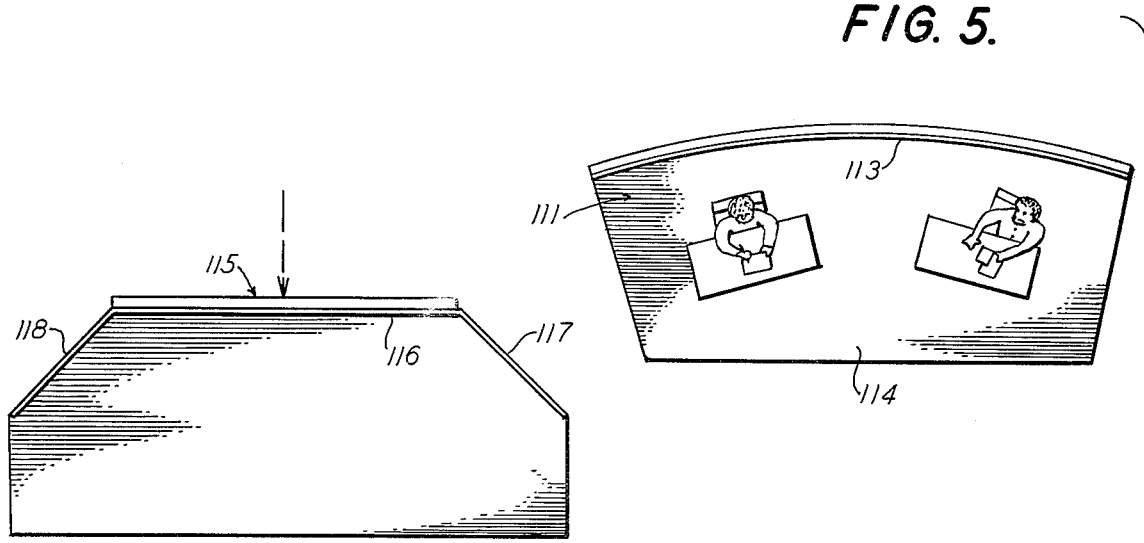
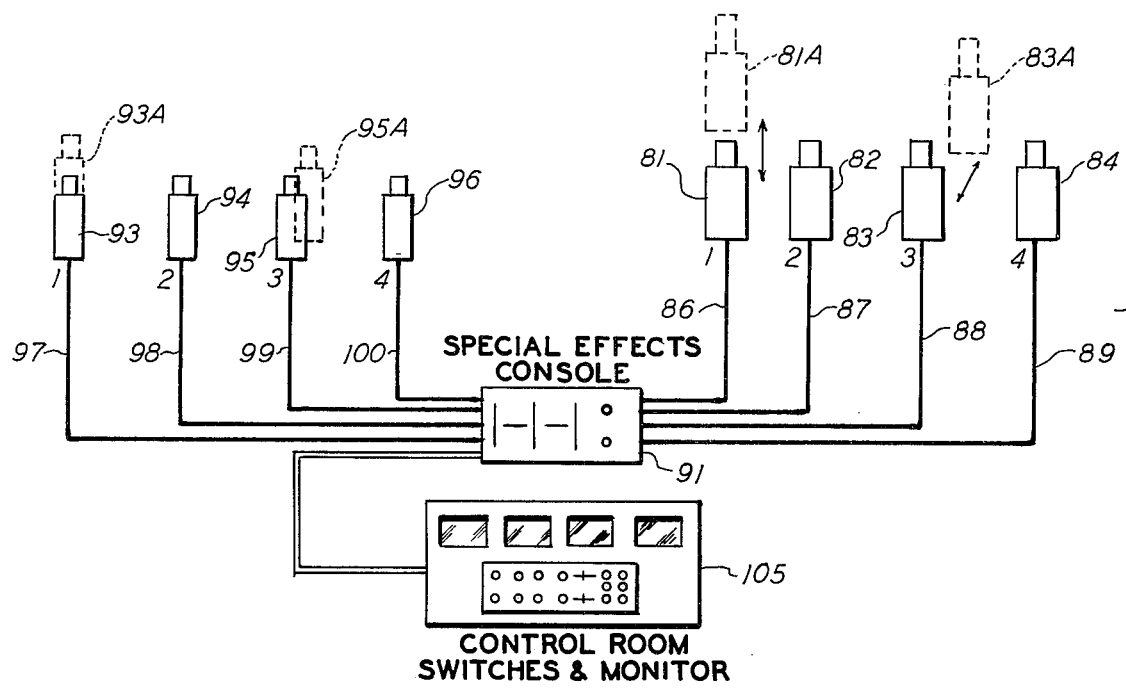
FIG. 5.

COMPATIBLE COMPOSITE IMAGE PROCESS

BACKGROUND OF THE INVENTION

For several years the television producing industry has used an ingenious system for achieving composite images called the "chroma key system." One television camera senses a subject in front of a densely colored background, usually a deep blue hue. A second camera, sensing a second subject, delivers an image to a compositor or mixer that is "keyed " to accept or intensify the second signal only in those areas of the first camera image where the intense color background is apparent. The first color is normally not used in the second subject and image, since the compositor or mixer is keyed to reject electronically the keyed color.

Basically there are two systems utilized in the chroma key process. One is the "Demodulated Video Signal System" and the other is described as the "Hue-dial Signal System." Both are set forth in clear terms in a technical publication by Kennedy and Gaskins entitled *"Electronic Composites in Modern Television."*

As this article points out, the "Hue-dial Signal System" is more generally used because the difficult delay problems are nonexistent in the second delineated system, and the apparatus of the "Hue-dial Signal System" is simpler. However, in both systems there is no compensation for the visual disorientation caused by non-scale adjustment of one camera with respect to the other. One effect which is objectionable is when a "zoom" lens is used on the first subject and not on the second, whereby the effect is given of the first subject moving without volition or visible locomotion toward the viewer, destroying any illusion of reality. The instant invention overcomes this and other deficient areas of concurrent imagery conventionally practiced in the television art, and affords a flexible method applicable to making masters for film productions as well as for broadcast tapes.

SUMMARY OF THE INVENTION

The invention contemplates, in a composite video picture process employing the chroma key system and at least a first and a second video camera each having actuating motors for control of camera attitude, a process which comprises the steps of comprehending a first subject placed before a single hued background with the first camera, preparing a second subject correlated with the first in a pre-selected scale relationship and comprehending or "shooting" said second subject with the second camera. The current flow levels in the actuating motors of the first camera for panning, dollying, focusing, etc. are sensed at each change of first camera attitude, and the sensed current values imposed on the actuator motors of the second camera, modifying said current value in accordance with the scale relationship, or modifying the mechanical resultant of said motors such that the images sensed by the 2 cameras remain in scale. The second camera image is sent to the mixer or electronic compositor, where, in conventional fashion, the single hue of the first camera image (the chroma key) is attenuated and the image of the second camera then dominates the single hue area from the first camera such that a composite image results. If time lags in the duplicating motion of the second camera are present, the output images of the first camera may be sent to a time delay suitably adjusted so that the images of the 2 cameras arrive at the mixer or compositor in time synchronism.

In a preferred process multiple pairs of first and second cameras are utilized, adding full artistic scope to the facilities available to the director, who may then select the most advantageous image or images to advance the story line or otherwise depict to the viewing audience the message desired.

As an alternative method to imposing the motion of the first or "master" camera on the second or "slave" camera of a pair by reading the current flow in camera actuating motors, the working floor for the cameras may be laid out in a grid pattern over which the camera operators are are directed, the respective floor grids for each camera being in accordance with the preselected scale relationship. This method accommodates camera position with respect to the subjects. Other camera attitudes are correlated by means of the previously mentioned sensing of camera actuating motor current flow.

The inventive method affords producers of television and motion picture programming a useful tool for achieving high quality process and special effects imagery without the need of full scale, expensive sets, and adapts to miniature sets, back projection screen process and other effects well within the technical skills of the art as it now exists. Adaptation of existing electrical and electronic devices to the special needs of the process is only a matter of routine wiring together of existing components, such that the process, once comprehended, may be employed readily in the industries to which it is adapted.

These and other advantages of the invention are apparent from the following detailed description and drawing.

BRIEF DESCRIPTION OF THE DRAWING

FIG. 1 is a schematic perspective view showing related sets employing the process of the invention;

FIG. 2 is a front elevation of the composite image resulting from the process and apparatus of FIG. 1;

FIG. 3 is a schematic plan section, partly broken away, showing the actuating apparatus for dollying and trucking;

FIG. 4 is a side elevation, with vertical clearances exaggerated for clarity, showing panning actuating apparatus; and FIG. 5 is a schematic plan layout of apparatus and wiring for implementation of the process of the invention.

DESCRIPTION OF THE PREFERRED EMBODIMENTS

In the several figures like reference numbers are used for like parts.

FIG. 1 shows a first set 5 and a second set 6. The first set has a curving backdrop 8 and a floor 9 exposed to a video camera 11. The exposed surfaces of the backdrop and the floor are a single hue, such as a deep blue conventionally used in the chroma key process.

An actor 12 is posed before the backdrop, as is a prop such as a seat 13.

A second video camera 15 scans the second set 6. The cameras may be common video equipment, such as made by Norelco and Ampex and conventionally mounted on pan supports 16 and floor dollies 17, with conventional pan motion servos and floor traverse electric drives as shown in FIGS. 3 and 4.

The second set comprises a vertical drop 19, which may be a rear projection screen, and vertical wings 21, 22, from which a floor or stage 24 extends toward the camera. Foliage props 26, 27 rest on the floor between the screen 19 and the camera. The two sets thus present live actor, static props and process projection screen. While a rear projection screen has been shown, the invention does not preclude substitution of video monitor or other video imaging devices for the screen.

The actor height is indicated by "$H_1$", while the second set height is indicated by "$H_2$", the desired relationship between these two measurements on the composite screen of FIG. 2 having been secondarily dictated by the types of props and primarily dictated by the choice of the producer or director as to whether the composite is to depict fantasy or reality.

The size relationship between the two sets is not necessarily that indicated by the schematic FIG. 1, but can vary, because of the versatility of the process, from 1 to 1 to 100 to 1, or even 1 to 100.

Where the two cameras remain fixed in their attitudes to their respective subjects, there has been conventionally little problem in maintaining scale between the two subjects. However, very few presentations, either video or film, can be portrayed without the camera dollying (arrow 31), trucking (arrow 32), scanning (arrow 33) or changing focus, depending upon the nature of the presentation and the style or format of the director. Therefore, as shown in FIG. 1, the current flow of the control motors of the "master" camera 11 is sensed, modified in accordance with scale by servo relay unit 35, communicated by lines 36 to servo control unit 37 of "slave" camera 15 such that the second camera responds to attitude changes of camera 11 in like manner and in proportion to the chosen scale. Since the slave camera may be lightweight, as is the Asaco ACC3000, response to master camera action is not opposed by great inertia in the slave camera. Mechanical arrangements of current flow sensing is described in greater detail with respect to the detailed description of FIGS. 3 and 4 later.

While servo unit 37 and servo relay unit 35 have been schematically shown exterior of the cameras, the invention does not preclude their incorporation within the camera case.

Lines 38, 39 communicate the sensed image of camera 11 and camera 15, respectively, to a compositor 41, which, in conventional fashion, accomplishes the signal adjustments of the chroma key process to give a composite output image. The image signal output, represented by line 44, may be communicated to the director's monitor as well as to the broadcast facility. In addition, it is desirable for quality control that the master cameraman have a continuous view of the composite. Therefore, the process provides for "jeeping" or bleeding a part of the slave camera output to the master camera viewfinder, as shown in FIG. 1, through a lead 45 off lead line 39 communicating to the viewfinder 47 of "master" camera 11.

The composite of sets 5 and 6 is shown in FIG. 2, where the images of screen 19, the images of props 13A, 26A, 27A and the image 12A of the actor are seen in a single scene. Similar composite images are communicated to mater master viewfinder 47, director's monitor (not shown), other monitors and the eventual home viewing screens.

In the case of film presentations, the composite is transmitted to tape recording means, from which film masters are made in completely conventional manner.

In FIG. 3 A "master" camera floor dolly 17 is broken away to show three arcuately spaced casters 48 supporting the dolly and pivotably mounted thereto by yokes 49 with shafts 50. Each shaft has a sprocket 51 and all the sprockets are linked by a chain 52. The chain is driven by a sprocket 53 on a vertical axle 54 journalled on the dolly. The axle bears a second driven sprocket 55 linked by a chain 56 to a drive sprocket 57 on a motor 58. The positions of the casters with respect to "dollying" or "trucking" are controlled by motor 58. Current flow in the motor 58 is inductively sensed by a coil 59 shown exterior of the motor, but which may be internal. The motor 58 is thus "read" and the signal induced imposed on the "slave" servo like servo 37 of FIG. 1 to accomplish a proper scale motion of the second camera in response to motion of the first camera.

In similar fashion the drive motors 61 of each dolly caster are "read" by coils such as coil 62, which is representative of a range of devices capable of this function, and the current induced in the coil imposed through a servo relay like relay 35 of FIG. 1 in proper magnitude upon the caster drive motors of the second camera to advance, withdraw or traverse the second camera dolly in response to like motion of the first camera.

In FIG. 4 the attitude control apparatus for the camera with respect to the dolly is schematically shown. A pan 64 supports a a swivel mount 65 above pan supports 16. The swivel in turn holds a gimbel plate 66 from which vertical mounts 67 extend to hold a shaft 68 journalled to the bottom of a video camera such as camera 11. A worm gear segment 69 is fixed to the camera, centered on the gimbel shaft. A drive worm 70 is mesh with the worm gear segment rotates the segment and, therefore, the camera, in response to power input to a servo motor 71 fixed to the gimbel plate. The camera may thus be "rocked" with respect to the dolly.

Swivel mount 65 has a horizontal worm gear 72 meshed with a drive worm 73 on the shaft of a servo motor 74 fixed to the pan 64. Rotation of the motor shaft turns the worm gear and the swivel mount, "panning" the camera with respect to the dolly. Each of the servo motors 71, 74 has a sensing device, schematically represented in FIG. 4 by a coil 75. The coil is energized by current flow in the motor, and the current induced is transmitted through a servo relay like relay 35 of FIG. 1 to the like motor of the second camera. The actuating motors of the second camera are thereby driven the needed time or revolutions to cause the second camera to duplicate the attitude change of this camera. It should be noted that the chain 52 of FIG. 3 sets the caster angle with respect to the dolly, and therefore, despite scale ratios between first and second sets, the angular displacement of the chain shall be the same for both first and second cameras, else the dollies will move on different paths with respect to their respective subjects.

While the foregoing description of the process has been specifically directed to a method wherein the sensed current value of an actuated control motor of the master camera has been modified in accordance with relative scale between the 2 sets to command the concommitant actuating motor on the second camera, it is preferred that scale motion be imposed by imposing on the second camera drive mechanisms from the actuating motors which are in scale with the desired relative motions with respect to the 2 sets. For instance, if the set of FIG. 1 for the master camera is twice the size of set 6 for the slave camera, then the driven gears 72 of both cameras will be in the ratio of 2 to 1, also. Similarly, the worms (not shown) driving the casters 48 of both cameras from the motors 61 shall be in the same ratio as the sets so that the actual travel of the dolly with respect to the set for each camera will be in accord with the set ratio.

FIG. 5 shows a schematic plan of a multi-camera combination useful in the practice of the process of the invention. There are 2 camera batteries, the first of "master" cameras 81, 82 and 83 and 84, with lead lines 86, 87, 88 and 89 respectively connecting to a special effects console 91. The console includes the mixer or compositor previously described with respect to FIG. 1. The master cameras may be of the wheeled dolly type such as the IVC 7000, with worm gear driven wheels electrically powered.

The second camera battery comprises "slave" cameras 93, 94, 95 and 96 each connected by is respective lead line 97, 98, 99 and 100 to console 91. The second cameras may be AKAI VTS150 cameras dolly mounted with electrically driven wheels. It is though the console that the servo relay unit and the servo control unit of each camera pair are implemented, the leads 86 – 89 and 97 – 100 being cable bundles also including image output lines for each camera.

As can be seen from FIG. 5 the output of the special effects console 91, including composite images formed in accordance with the conventional chroma key system and other methods, is fed to the control room switches and monitor panel for the benefit of the control technicians and directors. The panel 105 is schematically presented in FIG. 5 and may vary endlessly in meters, viewers switches and other control devices used therein as situations and programs vary.

The "master" camera battery is trained on a set 111 which may be a newsroom setting, with a vertical wall 113 and a floor area 114, both of which are preferably of a deep blue or other rich, primary hue. Chairs, desks and commentators occupy the first set. A second "set" may comprise a rear projection screen 116, with side wings 117, 118. A projected image to the screen is shown by the arrow 119. The "slave" camera battery is trained on the second set. Obviously, the composition of either set may vary widely in response to program demands.

In accordance with the method, movements of the master cameras, such as camera 81, are communicated to the slave cameras, such as correlative camera 93, through sensing the current flowing of the master camera actuating motors, modifying the amplitude of the sensed signal in accordance with the pre-selected scale relationship (or equipping each slave camera with gearing in accord with scale ratio) between set 111 and set 115 and applying the signal to the actuating motors of the slave camera through a servo system such that the 2 coupled cameras truck, dolly, pan or zoon in unison and in proportion to the scale selected. In FIG. 5, for instance, master camera 81 has advanced to position 81A shown by dotted lines, while slave camera 93 has also advanced, but over a lesser actual distance, in accordance with the selected scale. Preferably the servos drive worm gear mechanisms in order to effect camera motions, the cameras set forth above being equipped with electrical zoom lenses and electric iris control, both of which are conventional.

Master camera 83 has moved in a combined trucking and dollying motion to the position 83A (dotted lines) while the referred signal has caused a commensurate motion of camera 95 to position 95A.

In either of the illustrative FIGS. 1 or 5 mechanical or electrical lag may tend to defeat synchronism of the images arriving at the compositor from the paired cameras. Usually the slave image lags because of servo effect in making motions like those of the coupled camera. In order for the composite image from the paired cameras to be synchronous, it is desirable to transmit the image signal from the first, or master, camera through a delay circuit interposed between the camera and the compositor or other electronic mixing unit. In the illustration of FIG. 1 a delay 121 between master camera 11 and compositor 41 is preferably of an adjustable type so that the arrival at the compositor of the 2 signals will be in accordance with the control phase initiated by the master camera.

A similar delay device may be employed in the process which the apparatus of FIG. 5 implements, so that the process of the invention may be alternatively practiced to include the step of delaying the image signal from the master camera in accordance with the motion lag between paired cameras.

While some variations of method and apparatus have been disclosed herein, the scope of the invention has not been exhausted thereby. Other variations in accordance with the invention will occur to those skilled in this art, and it is therefore desired that the invention be measured by the appended claims rather than by the illustrative disclosure of this specification.

I claim:

1. In a composite video picture process employing the video chroma key process and at least a first and second video camera each having actuating motors engaging control mechanisms for controlling camera attitude toward the camera subject, the process comprising the steps of comprehending with the first camera a first subject before a single hued background, preparing a second correlated subject having a preselected scale relationship to the first subject, comprehending said second subject with said second video camera, sensing the current flow in the actuating motors of the first video camera at each change of first camera attitude, imposing the sensed current flow on the like motors of the second video camera, altering the effect of the current flow on the second camera actuating motors such that the control mechanism of said second camera respond in accordance with the preselected scale relationship between said first and second subjects, feeding the output of the first camera to a signal compositor switching system, feeding the output of the second video camera to a signal compositor switching system, and effecting a single composite image on a receptor device separate from the signal compositor system.

2. A process in accordance with claim 1 further including the step of conducting a portion of the image output of the second video camera to the viewing aperture of the first video camera.

3. A process in accordance with claim 1 wherein altering the effect of the current flow on the second camera actuating motors comprises the step of feeding the sensed current flow from the first video camera to a servo relay adjusted in accordance with the preselected ratio of scale.

4. A process in accordance with claim 1 wherein altering the effect of the current flow includes the step of adjusting the gear ratio of the control mechanisms of the second camera.

* * * * *